United States Patent [19]

Kato

[11] Patent Number: 4,586,259
[45] Date of Patent: May 6, 1986

[54] OUTPUT ROTATIONAL ANGLE INDICATING DEVICE OF ROCKING ROTATIONAL ANGLE ALTERING SYSTEM

[75] Inventor: Heizaburo Kato, Shizuoka, Japan

[73] Assignee: Sankyo Manufacturing Company, Ltd., Tokyo, Japan

[21] Appl. No.: 694,369

[22] Filed: Jan. 24, 1985

[30] Foreign Application Priority Data

Mar. 15, 1984 [JP] Japan .............................. 59-36858[U]

[51] Int. Cl.⁴ ............................................ F16H 21/44
[52] U.S. Cl. ........................................ 33/1 PT; 74/96
[58] Field of Search .................. 33/1 N, 1 PT; 74/96

[56] References Cited

U.S. PATENT DOCUMENTS 3,006,198 10/1961 Cohen et al. ............................. 74/96
3,013,437 12/1961 Harding ................................... 74/96
3,352,167 11/1967 Winters ................................... 74/96

FOREIGN PATENT DOCUMENTS 173946 11/1982 Japan .

Primary Examiner—Richard R. Stearns
Attorney, Agent, or Firm—Pollock, Vande Sande & Priddy

[57] ABSTRACT

A rocking rotational angle altering system is equipped with an improved output rotational angle indicating device. The device includes a movable block and a cam rod brought into engagement with each other in rolling contact. The movable block has rolling elements mounted to act as a unit therewith and the cam rod is formed with a flat cam surface engageable with the rolling elements of the movable block.

1 Claim, 4 Drawing Figures

OUTPUT ROTATIONAL ANGLE INDICATING DEVICE OF ROCKING ROTATIONAL ANGLE ALTERING SYSTEM

BACKGROUND OF THE INVENTION (1) Field of the Invention

This invention relates to an output rotational angle indicating device of a rocking rotational angle altering system for indicating an output rotational angle.

(2) Description of the Prior Art

I have made a proposal for an output rotational angle indicating device of a rocking rotational angle altering system which is disclosed in Japanese Utility Model Application No. 62436/81 (Utility Model Application Laid-Open No. 173946/82). This device comprises a first oscillating arm and a second oscillating arm connected to an input shaft and an output shaft respectively, and a connecting rod for connecting the first oscillating arm and second oscillating arm together. The device is constructed such that by moving axially the first oscillating arm by a magnitude corresponding to the magnitude of rotation of angle alteration drive means a portion of the connecting rod at which the connecting rod is connected to the first oscillating arm, it is possible to alter the rocking rotational angle of the output shaft with respect to the rocking rotational angle of the input shaft. The device further comprises a threaded rod connected to the angle alteration drive means to rotate for a magnitude corresponding to the magnitude of rotation of the drive means, a movable block threadably connected to the threaded rod for axial movement of the threaded rod when the latter rotates, the movable block including a contact member unitarily connected thereto, and a cam rod disposed parallel to the threaded rod and formed with a cam groove engageable with the contact member. The cam groove is profiled such that the cam rod is rotated for a magnitude corresponding to the difference between the magnitude of an actual change in the rocking rotational angle of the output shaft produced when the threaded rod is rotated and the magnitude of a change in the rocking angle showing approximately linearly the relation between the magnitude of rotation of the threaded rod and the magnitude of the change in the angle of rocking rotation of the output shaft. The device further comprises differential drive means for producing a rotational output corresponding to the magnitude of the actual change in the rocking rotational angle of the output shaft based on the rotation of the threaded rod and the rotation of the cam rod, and indicating means for indicating a rocking rotational angle corresponding to the rotational output of the differential drive means.

Some disadvantages are associated with the device of the aforesaid construction. One of them which is most important is that there are possibilities that the pressure angle formed by the contact member and the cam groove brought into engagement with each other becomes large. This might interfere with the movement of the contact member, thereby causing damage to the thread of the threaded rod, contact member and cam groove.

SUMMARY OF THE INVENTION

This invention has been developed for the purpose of obviating the aforesaid disadvantages of the prior art. Accordingly, the invention has as its object the provision of an output rotational angle indicating device of a rocking rotational angle altering system wherein the movable block and the cam rod are brought into engagement with each other in rolling contact.

To accomplish the aforesaid object, the invention provides outstanding characteristics that the movable block has rolling elements mounted to act as a unit therewith, and that the cam rod is formed with a flat cam surface engageable with the rolling elements of the movable block.

DESCRIPTION OF THE PREFERRED EMBODIMENT

A preferred embodiment of the invention will now be described in detail by referring to the accompanying drawings.

Figure 1:
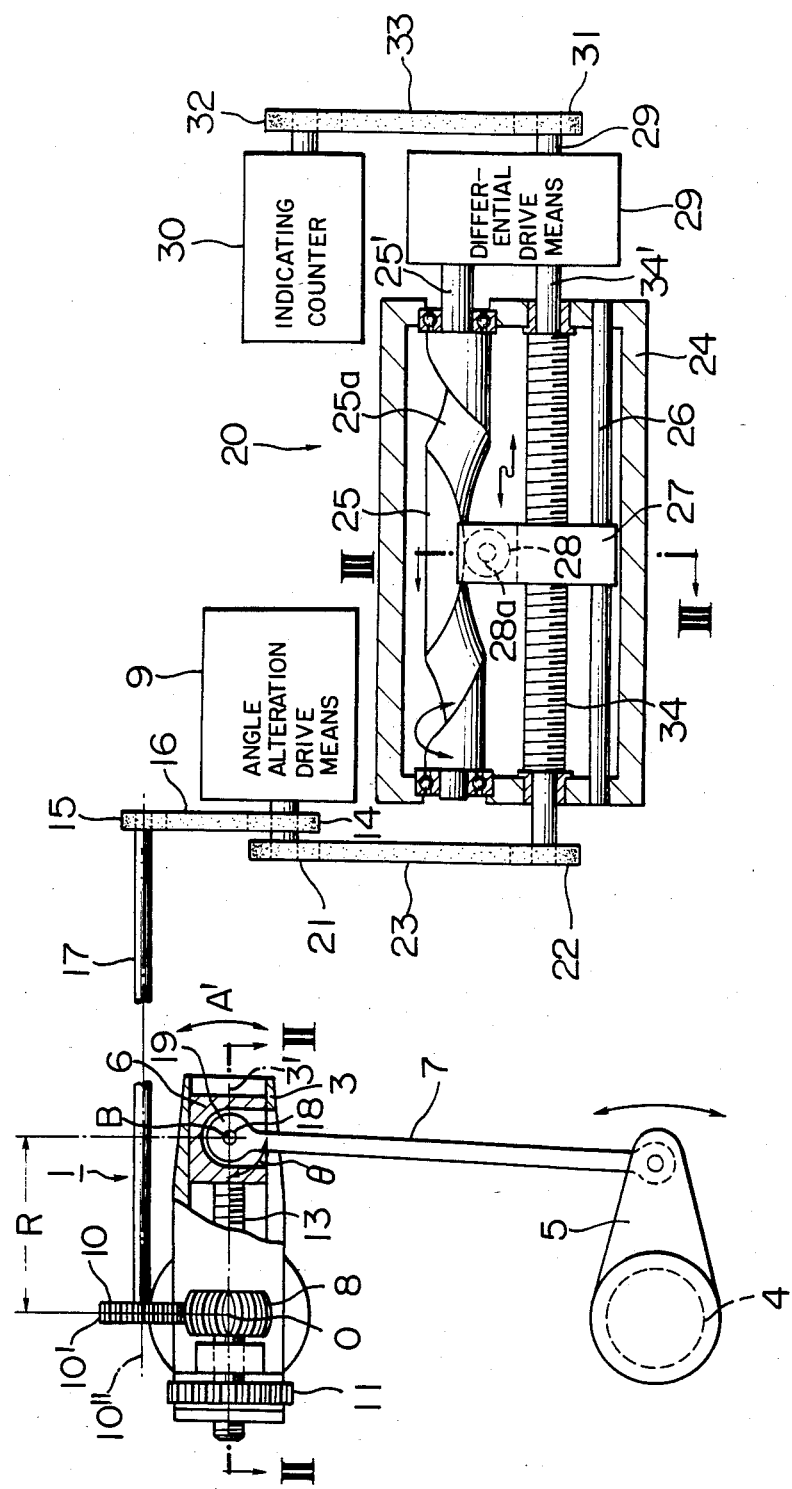
FIG. 1 is a view showing a structure of a rocking rotational angle altering system equipped with the output rotational angle indicating device comprising a preferred embodiment of the invention.
Figure 2:
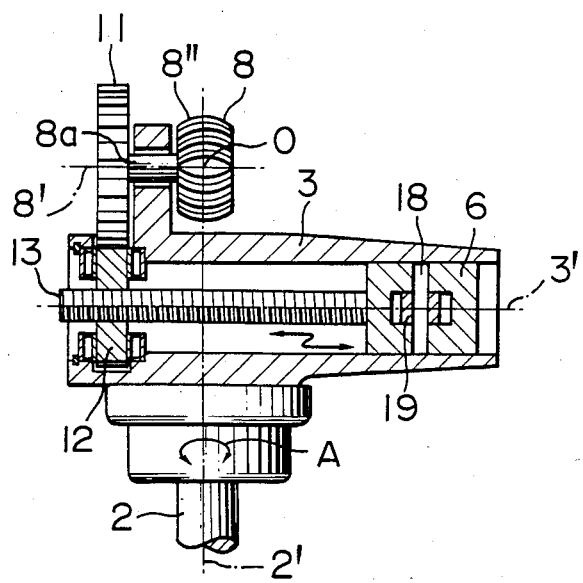
FIG. 2 is a sectional view taken along the line II—II in FIG. 1.

Referring to FIGS. 1 and 2, there is provided a rocking rotational angle altering system generally designated by the reference numeral 1 which comprises a first oscillating arm 3 extending substantially perpendicular (FIG. 2) to an input shaft 2 driven for rocking rotational movement and connected at one end thereof to the input shaft 2, and a second oscillating arm 5 extending parallel to the first oscillating arm 3 and connected at one end thereof to an output shaft 4. Located within the first oscillating arm 3 for sliding movement in an axial direction is a slider 6 which is connected to the second oscillating arm 5 through a connecting rod 7. Mounted within the first oscillating arm 3 is a crown gear 8 which is in meshing engagement with a spur gear 10 driven for rotation by angle alteration drive means 9.

When the input shaft 2 moves in rocking rotational movement as indicatd by arrows A shown in FIG. 2, the crown gear 8 moves in oscillatory movement as indicated by arrows A' in FIG. 1 together with the first oscillating arm 3 and in rotary movement in a plane including an axis 2' of the input shaft 2 and an axis 3' of the first oscillating arm 3 or about a rotational axis 8' extending in a direction perpendicular to the axis 2' of the input shaft 2 as viewed in the plane of FIG. 2. The crown gear 8 is formed with a multiplicity of teeth 8" located on an outer surface of a spherical body centered at the junction 0 of the axis 2' of the input shaft 2 and the rotational axis 8' of the crown gear 8. The teeth 8" extend arcuately toward the rotational axis 8' and mesh with teeth 10' of the spur gear 10 extending linearly in the same direction. Thus, when the crown gear 8 moves in oscillatory movement in the direction of arrows A' about the axis 2' of the input shaft 2, the arcuate teeth 8" is capable of displacing arcuately or in the oscillating direction while being maintained in meshing engagement with the teeth 10' of the spur gear 10. When the spur gear 10 rotates about its axis 10", the crown gear 8 is capable of rotating about its rotary axis 8' at all times.

Mounted at a left end of a rotary shaft 8a of the crown gear 8 is a drive gear 11 which is in meshing engagement with a follower gear 12 (FIG. 2) which in turn is in threadable engagement with a left end of a threaded rod 13 extending axially in the first oscillating arm 3 and secured to the slider 6 at its right end. Thus, as the angle alteration drive means 9 is energized and the spur gear 10 is rotated through a pair of pulleys 14 and 15, a timing belt 16 and a rod 17 to thereby rotate the crown gear 8 about the rotational axis 8' together with the rotary shaft 8a, the follower gear 12 is rotated through the drive gear 11 and the threaded rod 13 and slider 6 move in sliding movement in an axial direction in the first oscillating arm 3. By moving the slider 6 in sliding movement to move axially of the first oscillating arm 3 a portion B of the connecting rod 7 at which it is connected to the first oscillating arm 3, it is possible to vary the angle of oscillation of the second oscillating arm 5 relative to the angle of oscillation of the first oscillating arm 3. As can be clearly seen in FIG. 2, the first oscillating arm 3 moves in oscillatory movement about the center axis 2' of the input shaft 2 and the position of the center axis 2' corresponds to the position of the junction 0 shown in FIG. 1. When the slider 6 moves in sliding movement as described hereinabove, the distance R between the connection B of the connecting rod 7 to the first oscillating arm 3 and the junction 0 (the distance R being hereinafter referred to as a link length) undergoes a change, with a result that the angle θ formed by the connecting rod 7 and the axis 3' of the first oscillating arm 3 undergoes a change. Consequently, the angle of oscillation of the second oscillating arm 5 shows a change when the first oscillating arm 3 moves in oscillatory movement through a predetermined angle, so that the angle of rotation of the output shaft 4 shows a change accordingly.

In FIGS. 1 and 2, the reference numerals 18 and 19 designate a fixed pin in the slider 6 and a bearing member rotatably fitted to the fixed pin, respectively. The slider 6 is connected to the connecting rod 7 via the fixed pin 18 and the bearing member 19. The connecting rod 7 is connected to the second oscillating arm 5 in the same manner as described by referring to the connection B between the connecting rod 7 and first oscillating arm 3.

Output rotational angle indicating means 20 for indicating the angle of rotation of the output shaft 4 of the locking rotational angle altering system 1 will now be described.

Figure 3:
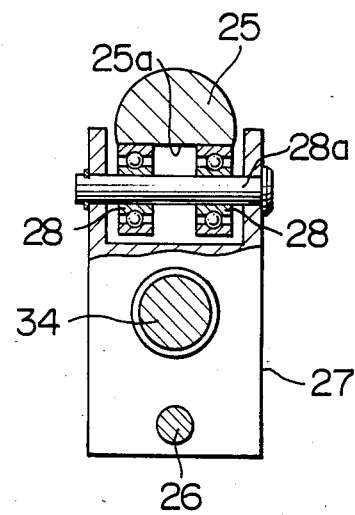
FIG. 3 is a sectional view taken along the line III—III in FIG. 1.

Referring to FIGS. 1 and 3, the output rotational angle indicating means comprises a threaded rod 34 and a cam rod 25 extending parallel to each other and rotatably supported in a housing 24.

The threaded rod 34 is connected at a left end thereof (FIG. 1) to the angle alteration drive means 9 via a pair of pulleys 21 and 22 and a timing belt 23. Mounted in the housing 24 and disposed parallel to the threaded rod 34 and cam rod 25 is a guide bar 26 which mounts a movable block 27 thereon for sliding movement. The movable block 27 is formed with a thread which meshes with the root of thread of the threaded rod 34.

Referring particularly to FIG. 3, the cam rod 25 includes a flat cam surface 25a arranged spirally on an outer surface of the cam rod 25, and rolling elements 28 mounted in the movable block 27 engage the flat cam surface 25a in rolling contact. In the embodiment shown, the rolling elements 28 are bearings rotatably mounted on a shaft 28a extending across a bifurcation located at an upper end of the movable block 27. As the threaded rod 34 rotates, the movable block 27 moves axially of the threaded rod 34, and the rolling elements 28 cooperate with the cam surface 25a as the movable block 27 moves as described hereinabove to cause the cam rod 25 to rotate. In the embodiment shown and described herein, the feature that the rolling elements or bearings 28 are in rolling contact with the cam surface 25a enables the device to achieve satisfactory performance without applying an inordinately high force or load to the structure, thereby prolonging the service life of the device.

As can be clearly seen in FIG. 1, right ends 25' and 34' of the cam rod 25 and threaded rod 34 respectively are connected to the input side of differential drive means 29 including an output shaft 29' which is connected via a pair of pulleys 31 and 32 and a timing belt 33 to indicating means which may be an indicating counter 30 as shown.

From the foregoing description, it will be appreciated that as the angle alteration drive means 9 is actuated to rotate, the slider 6 moves axially of the first oscillating arm 3 in sliding movement for a magnitude proportional to the magnitude of rotation of the means 9, thereby causing the link length R to change. The threaded rod 34 rotates for a magnitude proportional to the magnitude of rotation of the means 9 and the magnitude of sliding movement of the slider 6. Thus, if the angle of rocking rotation of the output shaft 4 underwent a change in linear relation to the magnitude of sliding movement of the slider 6, it would be possible to indicate in the indicating counter 30 the angle of rocking rotation of the output shaft 4 which changes in conformity with the magnitude of sliding movement of the slider 6 by directly connecting the right end 34' of the threaded rod 34 without requiring the provision of the cam rod 25 and differential drive means 29.

Figure 4:
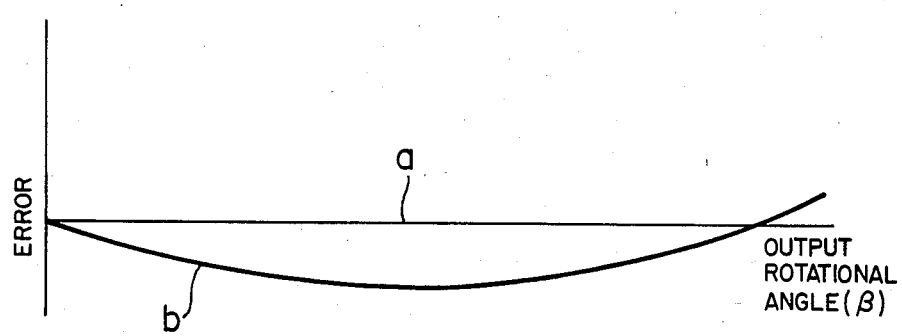
FIG. 4 is a view showing the relation between the sliding movement of the slider and the rotation of the output shaft of the rocking rotational angle altering system shown in FIG. 1.

However, in actual practice, the angle of rocking rotation α of the input shaft 2, the angle of rocking rotation β of the output shaft 4 and the link length R are related to each other such that their relation can be expressed as a function of $\beta = f(\alpha \cdot R)$. Therefore, the magnitude of sliding movement of the slider 6 and the magnitude of change in the angle of rocking rotation of the output shaft 4 are not linearly related to each other. More specifically, as shown in FIG. 4, when the slider 6 moves in sliding movement, the actual angle of rocking rotation β of the output shaft 4 undergoes a change as represented by a curve b. Consequently, if the right end 34' of the threaded rod 34 were directly connected to the indicating counter 30, the indicating counter would only indicate an angle of rocking rotation β which would be obtained by approximately indicating by a straight line a the magnitude of sliding movement of the slider 6 or the magnitude of rotion of the threaded rod 34 and the magnitude of change in the angle of rocking rotation of the output shaft 4.

In view of the foregoing, the cam rod 25 and differential drive means 29 are provided. More specifically, the cam rod 25 is intended to rotate, when the threaded rod 34 rotates and the movable block 27 having the rolling elements 28 moves in sliding movement, for a magnitude corresponding to the difference (or error) between the actual angle of rocking rotation of the output shaft 4 represented by the curve b in FIG. 4 and the approximate angle of rocking rotation thereof indicated by the straight line a. To this end, the cam surface 25a of the cam rod 25 is profiled such that the cam rod 25 rotates as described hereinabove. Also, the differential drive means 29 is designed such that it corrects the difference between the rotation of the threaded rod 34 and the rotation of the cam rod 25 and cause its output shaft 29' to rotate through an angle corresponding to the actual angle of rocking rotation of the output shaft 4. Thus, the indicating counter 30 connected to the output shaft 29' of the differential drive means 29 gives an indication of the actual angle of rocking rotation of the output shaft 4 which varies depending on the sliding movement of the slider 6.

The indicating means or indicating counter 30 has been described as indicating the rotational angle of the output shaft 4. However, it is not essential that the indicating counter 30 directly indicate the rotational angle of the output shaft 4. That is, when the output shaft 4 is connected to other working apparatus, not shown, to drive same, the indicating counter 30 may indicate the distance covered by the movement of a follower portion driven by an output shaft of the working apparatus or the distance covered by the movement of a workpiece transferred by the working apparatus so long as the rotational angle of the output shaft 4 corresponds to the distance covered by the movement of the follower portion or the distance covered by the movement of the workpiece. In this case, the indicating means 30 would indicate indirectly the rotational angle of the output shaft 4 by indicating the distance covered by the movement of the follower portion or workpiece.

From the foregoing description, it will be appreciated that the output rotational angle indicating device according to the invention enables changes in the angle of rocking rotation of the output shaft 4 to be positively and correctly indicated when the angle alteration drive means 9 is actuated.

What is claimed is:

1. In a rocking rotational angle altering system comprising a first oscillating arm connected to an input shaft, a second oscillating arm connected to an output shaft, a connecting rod connecting the first oscillating arm and second oscillating arm together, and angle alteration drive means for moving a portion of the connecting rod connected to the first oscillating arm axially of the first oscillating arm a distance proportional to the magnitude of rotation of the angle alteration drive means, to thereby vary the angle of rocking rotation of the output shaft with respect to the angle of rocking rotation of the input shaft, an output rotational angle indicating device comprising:

a threaded rod connected to said angle alteration drive means for rotation for a magnitude corresponding to the magnitude of rotation of the angle alteration drive means;

a movable block threadably connected to said threaded rod for movement axially thereof when it rotates, said movable block having rolling elements mounted therein to act as a unit therewith;

a cam rod disposed parallel to said threaded rod and formed with a flat cam surface engaging said rolling elements, said cam surface being profiled such that the cam rod is caused to rotate for a magnitude corresponding to the difference between the magnitude of an actual change in the angle of rocking rotation of the output shaft produced when the threaded rod is rotated and the magnitude of a change in the rocking angle showing approximately linearly the relation between the magnitude of rotation of the threaded rod and the magnitude of the change in the angle of rocking rotation of the output shaft;

differential drive means producing a rotational output corresponding to the magnitude of the actual change in the angle of rocking rotation of the output shaft based on the rotation of the threaded rod and the rotation of the cam rod; and indicating means for indicating an angle of rocking rotation corresponding to the rotational output of said differential drive means.

* * * * *